United States Patent
Lee et al.

(10) Patent No.: US 9,723,291 B2
(45) Date of Patent: Aug. 1, 2017

(54) APPARATUS AND METHOD FOR GENERATING 3D VIDEO DATA

(75) Inventors: Gun Ill Lee, Seoul (KR); Kwang-Cheol Choi, Gwacheon-si (KR); Jae-Yeon Song, Seoul (KR); Seo-Young Hwang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1200 days.

(21) Appl. No.: 13/352,982

(22) Filed: Jan. 18, 2012

(65) Prior Publication Data
US 2012/0188335 A1   Jul. 26, 2012

(30) Foreign Application Priority Data
Jan. 26, 2011 (KR) .................. 10-2011-0008004

(51) Int. Cl.
*H04N 7/24* (2011.01)
*H04N 13/00* (2006.01)
(Continued)

(52) U.S. Cl.
CPC .......... *H04N 13/0048* (2013.01); *H04N 7/24* (2013.01); *H04N 13/0066* (2013.01);
(Continued)

(58) Field of Classification Search
CPC ..... H04N 13/00; H04N 13/02; H04N 13/0048
(Continued)

(56) References Cited

U.S. PATENT DOCUMENTS 5,767,898 A * 6/1998 Urano .................. G06T 9/007
348/43
6,163,337 A * 12/2000 Azuma ................. G06T 15/10
348/43
(Continued)

FOREIGN PATENT DOCUMENTS

KR  1020090026012  3/2009
KR  1020090100189  9/2009

OTHER PUBLICATIONS

Korean Office Action dated May 10, 2017 issued in counterpart application No. 10-2011-0008004, 10 pages.

*Primary Examiner* — Jay Au Patel
*Assistant Examiner* — Irfan Habib
(74) *Attorney, Agent, or Firm* — The Farrell Law Firm, P.C.

(57) ABSTRACT

A plurality of video input units generate video frames and provide shooting characteristics. A 3D video frame generator creates a 3D video frame by combining a plurality of video frames, which are provided from the plurality of video input units, respectively, and provides 3D video frame composition information indicating a composition type of the plurality of video frames included in the 3D video frame, and resolution control information indicating adjustment/non-adjustment of resolutions of the video frames. A 3D video frame encoder outputs an encoded 3D video stream by encoding the 3D video frame provided from the 3D video frame generator. A composition information checker checks 3D video composition information including the shooting
(Continued)

information, the 3D video frame composition information, and the resolution control information. A 3D video data generator generates 3D video data by combining the 3D video composition information and the encoded 3D video stream.

10 Claims, 13 Drawing Sheets

(51) Int. Cl.
  *H04N 21/234* (2011.01)
  *H04N 21/2343* (2011.01)
  *H04N 21/81* (2011.01)
(52) U.S. Cl.
  CPC ............... *H04N 21/23412* (2013.01); *H04N 21/234318* (2013.01); *H04N 21/234363* (2013.01); *H04N 21/816* (2013.01); *H04N 21/8146* (2013.01)
(58) Field of Classification Search
  USPC ........................................................ 348/43
  See application file for complete search history.

(56) References Cited

U.S. PATENT DOCUMENTS

| | | | | |
|---|---|---|---|---|
| 6,441,844 B1* | 8/2002 | Tatsuzawa | H04N 13/0048 | 348/42 |
| 6,466,208 B1* | 10/2002 | Yet | G06T 15/10 | 345/419 |
| 7,471,809 B2* | 12/2008 | Miyazaki | G01C 11/06 | 382/107 |
| 7,590,303 B2* | 9/2009 | Lee | G06T 5/008 | 382/260 |
| 7,643,672 B2* | 1/2010 | Era | H04N 13/0018 | 345/8 |
| 7,782,937 B2* | 8/2010 | Yun | H04N 7/17318 | 375/240.01 |
| 8,031,767 B2* | 10/2011 | Lee | H04N 13/0066 | 348/218.1 |
| 8,208,790 B2* | 6/2012 | Toma | G11B 27/3027 | 386/241 |
| 8,334,893 B2* | 12/2012 | Hartman | G06T 15/20 | 348/46 |
| 8,400,496 B2* | 3/2013 | Robinson | G09G 3/003 | 345/422 |
| 8,406,619 B2* | 3/2013 | Cameron | H04N 13/0239 | 348/345 |
| 8,547,420 B2* | 10/2013 | Tomizawa | G03B 17/38 | 346/47 |
| 8,581,967 B2* | 11/2013 | Jian | H04N 13/0011 | 348/54 |
| 8,619,121 B2* | 12/2013 | Pockett | G03B 35/08 | 348/42 |
| 8,655,163 B2* | 2/2014 | Pace | H04N 13/025 | 396/322 |
| 8,665,968 B2* | 3/2014 | Chen | H04N 13/0048 | 348/43 |
| 8,677,436 B2* | 3/2014 | Nagasawa | H04N 13/0033 | 348/43 |
| 8,723,919 B2* | 5/2014 | Seong | H04N 13/0022 | 348/42 |
| 8,736,667 B2* | 5/2014 | Thorpe | H04N 13/0003 | 348/42 |
| 8,803,906 B2* | 8/2014 | Chen | G06Q 30/02 | 345/581 |
| 8,860,784 B2* | 10/2014 | Kobayashi | H04N 13/026 | 348/43 |
| 8,860,829 B2* | 10/2014 | Myokan | H04N 5/144 | 348/208.99 |
| 8,896,664 B2* | 11/2014 | Lee | H04N 13/0048 | 348/42 |
| 8,982,277 B2* | 3/2015 | Wan | H04N 19/46 | 348/441 |
| 9,154,814 B2* | 10/2015 | Luthra | H04N 13/0029 | |
| 9,167,227 B2* | 10/2015 | Nagasawa | H04N 13/0033 | |
| 9,185,400 B2* | 11/2015 | Hrebien | H04N 13/0048 | |
| 9,191,645 B2* | 11/2015 | Nagasawa | H04N 13/0033 | |
| 9,258,541 B2* | 2/2016 | Choe | H04N 5/44591 | |
| 9,300,903 B2* | 3/2016 | Mochinaga | H04N 5/76 | |
| 9,392,253 B2* | 7/2016 | Yang | G02B 27/2264 | |
| 9,420,258 B1* | 8/2016 | Huang | H04N 13/0048 | |
| 9,445,077 B2* | 9/2016 | Choe | H04N 13/007 | |
| 2004/0150728 A1* | 8/2004 | Ogino | G06T 7/0022 | 348/239 |
| 2005/0057806 A1* | 3/2005 | Nozawa | G02B 13/04 | 359/462 |
| 2005/0129325 A1* | 6/2005 | Wu | G06T 7/593 | 382/254 |
| 2008/0198920 A1* | 8/2008 | Yang | H04N 13/0018 | 375/240.01 |
| 2008/0304766 A1* | 12/2008 | Lee | H04N 13/0066 | 382/276 |
| 2009/0066783 A1* | 3/2009 | Lee | H04N 13/0048 | 348/43 |
| 2009/0148070 A1* | 6/2009 | Hwang | H04N 13/0048 | 382/305 |
| 2009/0219282 A1* | 9/2009 | Kim | H04N 19/50 | 345/419 |
| 2009/0317061 A1* | 12/2009 | Jung | H04N 13/0003 | 386/248 |
| 2010/0231689 A1* | 9/2010 | Bruls | H04N 13/0022 | 348/43 |
| 2010/0260268 A1* | 10/2010 | Cowan | H04N 13/0048 | 375/240.25 |
| 2010/0271465 A1* | 10/2010 | Lee | H04N 13/0048 | 348/51 |
| 2010/0303444 A1* | 12/2010 | Sasaki | G11B 27/105 | 386/248 |
| 2011/0122233 A1* | 5/2011 | Kasai | H04N 5/23203 | 348/49 |
| 2011/0134214 A1* | 6/2011 | Chen | H04N 19/597 | 348/43 |
| 2011/0249757 A1* | 10/2011 | Newton | H04N 13/004 | 375/240.25 |
| 2014/0347350 A1* | 11/2014 | Tseng | G06T 7/55 | 345/419 |
| 2014/0347362 A1* | 11/2014 | Maleki | H04N 13/0029 | 345/427 |

* cited by examiner

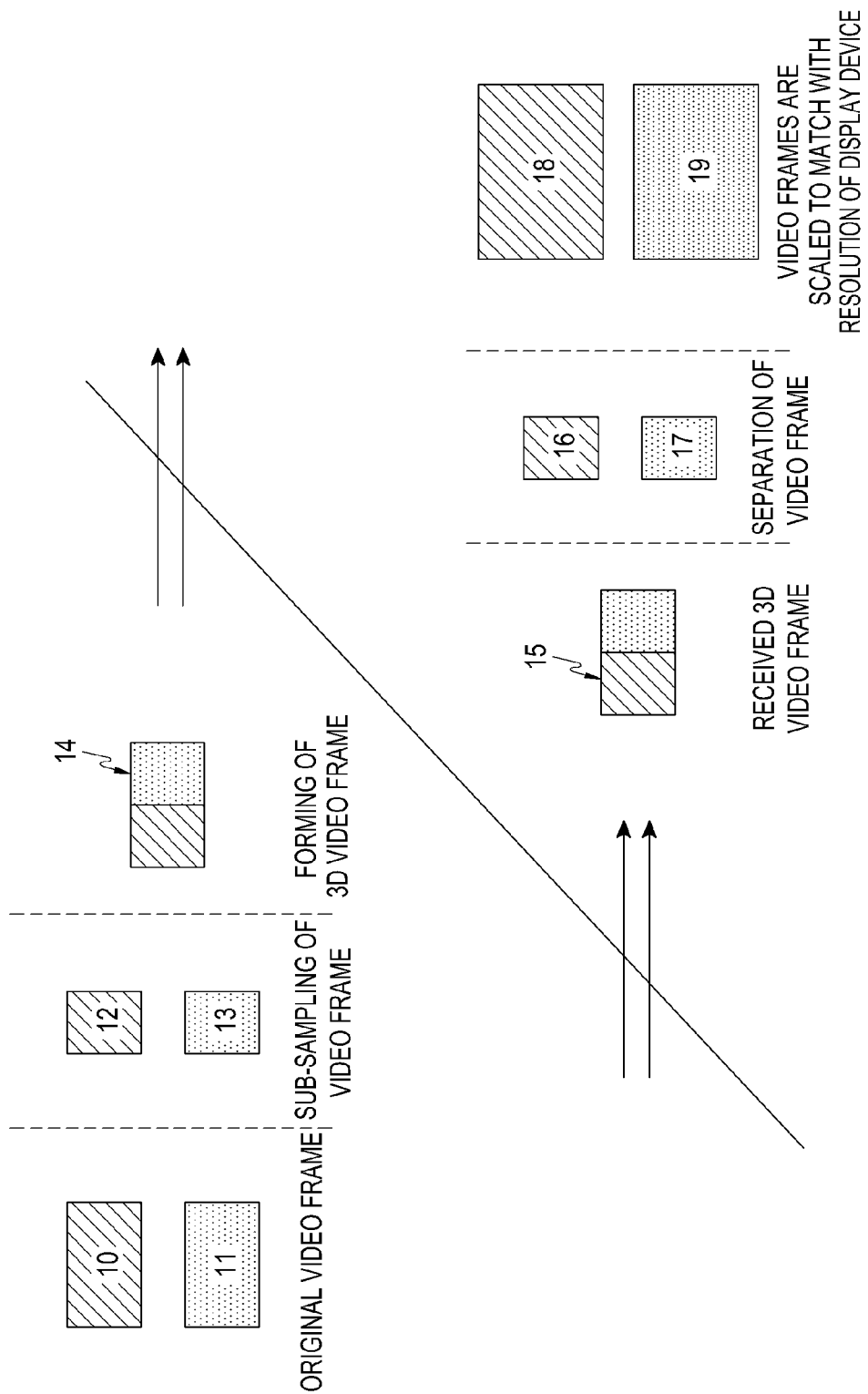

| * | ftyp | | | | | file type and compatibility |
|---|---|---|---|---|---|---|
| | pdin | | | | | Progressive download information |
| * | moov | | | | | container for all the metadata |
| * | | mvhd | | | | movie header |
| * | | trak | | | | container for an individual track or stream |
| * | | | tkhd | | | track header, overall information about the track |
| | | | tref | | | track reference container "svdp" for Left/Right view sequence type |
| | | | edts | | | edit list container |
| | | | | elsl | | an edit list |
| * | | | mdia | | | container for the media information in a track |
| * | | | | mdhd | | media header, overall information about the media |
| * | | | | hdlr | | handler declares the media (handler) type "soun" for audio data "vide" for visual data "sdsm" for LASeR data |
| * | | | | minf | | media information container |
| | | | | | vmhd | video media header, overall information (video track only) |
| | | | | | smhd | sound media header, overall information (sound track only) |
| | | | | | hmhd | hint media header, overall information (hint track only) |
| | | | | | nmhd | null media header, overall information (some tracks only) |
| * | | | | | dinf | data information box, container |
| * | | | | | | dref | data reference box, declares soure(s) of media data in track |
| * | | | | | stbl | sample table box, container for the time/space map |
| * | | | | | | stsd | sample descriptions (codec types, initialization etc.) "lsr1" for LASeR data |
| * | | | | | | stls | (decoding) time-to-sample |
| | | | | | | ctts | (composition) time to sample |
| * | | | | | | stsc | sample-to-chunk, partial data-offset information |
| * | | | | | | stsz | sample sizes (framing) |
| | | | | | | stz2 | compact sample sizes (framing) |
| * | | | | | | stco | chunk offset, partial data-offset information |
| | | | | | | co64 | 64-bit chunk offset |
| | | | | | | stss | sync sample table (random access point) |
| * | | | | | | svmi | stereoscopic video media information |
| | | | | ipmc | | IPMP Control Box |
| | mdat | | | | | media data container |
| | meta | | | | | Metadata |
| * | | hdlr | | | | handler, declares the metadata (handler) type |
| | | iloc | | | | item location |
| | | iinf | | | | item information |
| | | pdml | | | | XML container |
| | | bxml | | | | binary XML container |
| | | sodi | | | | stereoscopic camera and display information |

FIG.2

8.4 Stereoscopic Video Media Information Box

8.4.1 Definition

Box Type: 'svmi'
Container: Sample Table Box ('stbl')
Mandatory: Yes
Quantity: Exactly one The 'svmi' box provides stereoscopic video media information regarding the stereoscopic visual type and also, for the care of some mixed contents, fragments information. The visual type information signals the composition type of the stereoscopic video sequence and the structure of fragments. The fragment information represents the number of fragments, the number of consecutive samples, and whether the current sample is stereoscopic or not.

8.4.2 Syntax

```
aligned (8) class StereoscopicVideoMediaInformationBox extends
        FullBox('svmi', version = 0, 0) (
        // stereoscopic visual type information
        unsigned int (8)    stereoscopic_composition_type;
        unsigned int (7)    reserved = 0;
        unsigned int (1)    is_left_first;

// stereo_mono_change information
        unsigned int (32) stereo_mono_change_count;
        for (i=1; i<=stereo_mono_change_count; i++) {
            unsigned int (32)  sample_count;
            unsigned int (7)   reserved = 0;
            unsigned int (1)   stereo_flag;
        }
}
```

FIG.4A

| VALUE | STEREOSCOPIC_COMPOSITION_TYPE |
|---|---|
| 0x00 | SIDE-BY-SIDE (HALF) TYPE |
| 0x01 | VERTICAL LINE INTERLEAVED TYPE |
| 0x02 | FRAME SEQUENTIAL TYPE |
| 0x03 | LEFT/RIGHT VIEW SEQUENCE TYPE |
| 0x04 | TOP-BOTTOM (HALF) TYPE |
| 0x05 | SIDE-BY-SIDE (HALF) TYPE |
| 0x06 | TOP-BOTTOM (HALF) TYPE |
| 0x07-0xFF | RESERVED |

FIG.4B

◎ Stereoscopic Video Media Information Box

[Definition]
Box Type: 'svmi'
Container: Sample Table Box ('stbl')
Mandatory: Yes
Quantity: Exactly one

[Syntax]
aligned(8) class StereoscopicVideoMediaInformationBox extends FullBox('svmi', version = 0, 0)
{
　// stereoscopic visual type information
unsigned int(8)　stereoscopic_composition_type;

if((stereoscopic_composition_type==0) || (stereoscopic_composition_type==4))
{
unsigned int(7)　reserved = 0;
unsigned int(1)　is_half_resolution;
} unsigned int(7)　reserved = 0;
unsigned int(1)　is_left_first;

// stereo_mono_change _information
unsigned int(32) stereo_mono_change_count;
for(i=1; i<=stereo_mono_change_count; i++)
{
unsigned int(32)　sample_count;
unsigned int(7)　reserved = 0;
unsigned int(1)　stereo_flag;
}
}

FIG.5A

| Value | STEREOSCOPIC_COMPOSITION_TYPE |
|---|---|
| 0x00 | SIDE-BY-SIDE TYPE |
| 0x01 | VERTICAL LINE INTERLEAVED TYPE |
| 0x02 | FRAME SEQUENTIAL TYPE |
| 0x03 | LEFT/RIGHT VIEW SEQUENCE TYPE |
| 0x04 | TOP-BOTTOM TYPE |
| 0x05-0xFF | RESERVED |

◎ Stereoscopic Video Media Information Box

[Definition]
Box Type: 'svmi'
Container: Sample Table Box ('stbl')
Mandatory: Yes
Quantity: Exactly one

[Syntax]
aligned(8) class StereoscopicVideoMediaInformationBox extends FullBox('svmi', version = 0, 0)
{
   // stereoscopic visual type information
unsigned int(8)  stereoscopic_composition_type;

if((stereoscopic_composition_type==0) || (stereoscopic_composition_type==4))
{
unsigned int(32)   ratio_M_size;
unsigned int(32)   ratio_N_size;
} unsigned int(7)  reserved = 0;
unsigned int(1)  is_left_first;

// stereo_mono_change _information
unsigned int(32) stereo_mono_change_count;
for(i=1; i<=stereo_mono_change_count; i++)
{
unsigned int(32)   sample_count;
unsigned int(7)    reserved = 0;
unsigned int(1)    stereo_flag;
}
}

FIG.6B

APPARATUS AND METHOD FOR GENERATING 3D VIDEO DATA

PRIORITY

This application claims priority under 35 U.S.C. §119(a) to a Patent Application filed in the Korean Intellectual Property Office on Jan. 26, 2011 and assigned Ser. No. 10-2011-0008004, the entire disclosure of which is incorporated herein by reference.

BACKGROUND OF THE INVENTION

1. Field of the Invention

The present invention relates generally to a video data processing apparatus and method, and, more particularly, to an apparatus and method for processing 3-Dimensional (3D) video.

2. Description of the Related Art

Recently, techniques for providing 3D video using stereoscopic video have been developed. For stereoscopic video, 3D video frames are created by generating two video frames using cameras positioned at two different views, just like viewing an object with both eyes, and combining the generated video frames. The generated video frames are rendered and played by a 3D video output apparatus such that a user may feel a sense of perspective and reality. The 3D video output apparatus plays stereoscopic video in a way of having different 2-Dimensional (2D) images formed on both eyes of a user, or alternately displaying different 2D images on a display.

FIG. 1 illustrates a process of processing 3D video frames created according to the conventional technique.

A 3D video generation apparatus according to a conventional technique generates an original left-video frame 10 and an original right-video frame 11, and generates a sampled left-video frame 12 and a sampled right-video frame 13 by performing ½ sub-sampling on the original left-video frame 10 and the original right-video frame 11, respectively. The 3D video generation apparatus generates a 3D video frame 14 composed in a side-by-side type by horizontally arranging the sampled left-video and right-video frames 12 and 13. The generated 3D video frame 14 is created in 3D video data in the "ISO/IEC FDIS 23000-11:2009 Information technology—Multimedia application format (MPEG-A)-Part 11: Stereoscopic Video Application Format" as illustrated in FIG. 2, and provided to a 3D video output apparatus.

The 3D video output apparatus receives 3D video data, and detects a 3D video frame 15 from the 3D video data. The 3D video output apparatus separates a left-video frame 16 and a right-video frame 17 from the detected 3D video frame 15, and creates a left-video frame 18 and a right-video frame 19 having a resolution size of a display device by scaling the separated left-video frame 16 and the separated right-video frame 17 according to the resolution of the display device, respectively.

Conventionally, the 3D video output apparatus may up-scale the left-video frame 16 and the right-video frame 17 separated from the 3D video frame 15 according to the resolution of the display device regardless of the resolution size of the original video frames, possibly causing distortion of 3D video played on the display device.

Additionally, to generate the 3D video frame 14, the 3D video generation apparatus would perform ½ sub-sampling on the original left-video frame 10 and the original right-video frame 11, leading to a reduction in the resolution of the 3D video.

SUMMARY OF THE INVENTION

An aspect of the present invention is to address at least the above-mentioned problems and/or disadvantages and to provide at least the advantages described below. Accordingly, an aspect of embodiments of the present invention is to provide an apparatus and method for processing 3D video data without resolution degradation and distortion of a left-video frame and a right-video frame included in a 3D video frame.

In accordance with one aspect of the present invention, there is provided an apparatus for generating 3-Dimensional (3D) video data. The apparatus includes a plurality of video input units for generating video frames by detecting video information received through an image sensor, and providing shooting information including shooting characteristics of the video information; a 3D video frame generator for forming a 3D video frame by combining a plurality of video frames, which are provided from the plurality of video input units, respectively, and providing 3D video frame composition information indicating a composition type of the plurality of video frames included in the 3D video frame, and resolution control information indicating adjustment/non-adjustment of resolutions of the video frames; a 3D video frame encoder for outputting an encoded 3D video stream by encoding the 3D video frame provided from the 3D video frame generator; a composition information checker for checking 3D video composition information including the shooting information, the 3D video frame composition information, and the resolution control information; and a 3D video data generator for generating 3D video data by combining the 3D video composition information and the encoded 3D video stream.

In accordance with another aspect of the present invention, there is provided an apparatus for outputting 3-Dimensional (3D) video data. The apparatus includes a 3D video data parser for separately providing an encoded 3D video stream and composition information included in 3D video data; a 3D video frame decoder for decoding the encoded 3D video stream provided from the 3D video data parser; a 3D video scaler for separating the plurality of video frames included in the 3D video frame by checking 3D video frame composition information indicating a composition type of the plurality of video frames included in the 3D video frame, checking resolution control information indicating adjustment/non-adjustment of resolutions of the video frames, and converting the resolutions of the video frames to match with a resolution of a display device based on the resolution control information; and a 3D video formatter for outputting the video frames according to a 3D video output scheme of the display device.

In accordance with another aspect of the present invention, there is provided a method for generating 3-Dimensional (3D) video data. The method includes generating a plurality of video frames by detecting video information received through an image sensor; forming a 3D video frame by combining the plurality of video frames; outputting an encoded 3D video stream by encoding the 3D video frame; generating 3D video composition information that includes shooting information including shooting characteristics of the video information, 3D video frame composition information indicating a composition type of the plurality of video frames included in the 3D video frame, and resolution control information indicating adjustment/non-adjustment of resolutions of the video frames; and generating 3D video data by combining the encoded 3D video stream and the 3D video composition information.

In accordance with yet another aspect of the present invention, there is provided a method for outputting 3-Dimensional (3D) video data. The method includes separating an encoded 3D video stream and composition information included in 3D video data; decoding the encoded 3D video stream; separating a plurality of video frames included in a 3D video frame by checking 3D video frame composition information indicating a composition type of the plurality of video frames included in the 3D video frame, from the composition information; checking resolution control information indicating adjustment/non-adjustment of resolutions of the video frames, from the composition information, and converting the resolutions of the video frames to match with a resolution of a display device based on the resolution control information; and outputting the video frames according to a 3D video output scheme of the display device.

BRIEF DESCRIPTION OF THE DRAWINGS

The above and other aspects, features and advantages of certain embodiments of the present invention will be more apparent from the following description taken in conjunction with the accompanying drawings, in which:

FIG. 1 is a diagram illustrating video frames created according to a conventional technique;

FIG. 2 is a diagram illustrating a file format (ISO/IEC 23000-11:2009 Stereoscopic Video Application Format) of 3D video data created according to a conventional technique;

FIG. 4A is a diagram illustrating an example of an svmi box included in 3D video data generated by a 3D video generation apparatus according to an embodiment of the present invention;

FIG. 4B is a diagram illustrating an example of an identifier included in a stereoscopic_composition_type field included in the svmi box shown in FIG. 4A;

FIG. 5A is a diagram illustrating another example of an svmi box included in 3D video data generated by a 3D video generation apparatus according to an embodiment of the present invention;

FIG. 6B is a diagram illustrating another example of an svmi box included in 3D video data generated by a 3D video generation apparatus according to an embodiment of the present invention;

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. Additionally, descriptions of well-known functions and constructions are omitted for clarity and conciseness.

Figure 3:
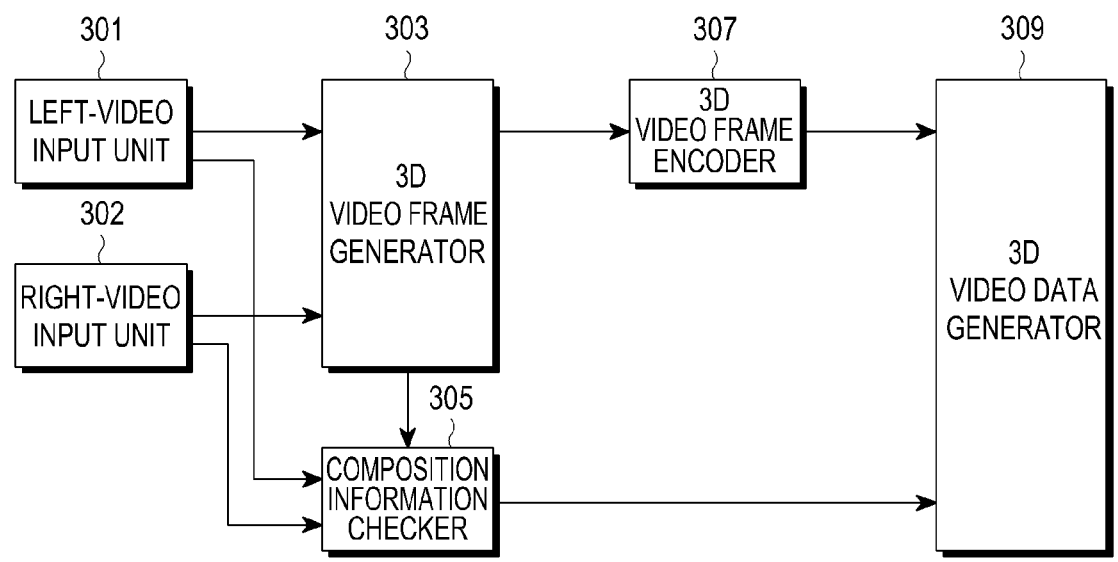
FIG. 3 is a block diagram illustrating a structure of a 3D video generation apparatus according to an embodiment of the present invention.

FIG. 3 is a block diagram illustrating a structure of a 3D video generation apparatus according to an embodiment of the present invention.

Referring to FIG. 3, the 3D video generation apparatus includes a plurality of video input units 301 and 302, a 3D video frame generator 303, a composition information checker 305, a 3D video frame encoder 307, and a 3D video data generator 309.

In one embodiment of the present invention, the term "3D video" as used herein may refer to stereoscopic video, and the plurality of video input units may refer to a left-video input unit 301 and a right-video input unit 302, which generate and output left-video and right-video constituting stereoscopic video, respectively.

Although the 3D video refers to stereoscopic video in an embodiment of the present invention, the 3D video defined in the present invention is not limited thereto, and may include various different types of 3D video, which may be created by a combination of a plurality of video frames. The video input units may be modified in various ways according to the formats of the 3D video.

The left-video input unit 301, which is a means for receiving left-video used to generate stereoscopic video, includes a first lens for projecting a color signal of a specific wavelength reflecting from the left side of a subject, and a plurality of sensor modules (e.g., modules including a sensor such as CCD and CMOS) for converting the color signal received through the first lens into an electrical signal. The left-video input unit 301 may include a video signal processing device for generating video frames (left-video frames) by converting data received from the plurality of sensor modules into video information including temporal/spatial information.

The right-video input unit 302 generates video frames, like the left-video input unit 301. To compose stereoscopic video, the right-video input unit 302 includes a plurality of sensor modules for converting a color signal received through a second lens prepared to be spaced apart from the first lens of the left-video input unit 301, into an electrical signal, and a video signal processing device for generating video frames (right-video frames) by converting data received from the plurality of sensor modules into video information including temporal/spatial information.

The left-video input unit 301 and the right-video input unit 302 may provide information indicating the characteristics of the video input units (e.g., information indicating the type of cameras, and information indicating the features of the cameras), and shooting information including the distance from the subject, the shooting angle, the movement of the shooting device (i.e., camera), and the like.

The 3D video frame generator 303 generates a 3D video frame by combining the left-video frame and the right-video frame received from the left-video input unit 301 and the right-video input unit 302 in any one of various 3D video composition types. For example, the 3D video frame generator 303 may generate a 3D video frame composed in a side-by-side type by horizontally arranging the left-video frame and the right-video frame; generate a 3D video frame composed in a vertical line interleaved type by vertically splitting the left-video frame and the right-video frame, and arranging segments of the split left-video and right-video frames in an interleaved way; generate a 3D video frame composed in a frame sequential type by sequentially arranging the left-video frame and the right-video frame; generate a 3D video frame composed in a left/right view sequential type by alternately and sequentially arranging the left-video frame and the right-video frame; and generate a 3D video frame composed in a top-bottom type by vertically arranging the left-video frame and the right-video frame. The 3D video frame generator 303 may generate a 3D video frame by combining the left-video frame and the right-video received from the left-video input unit 301 and the right-video input unit 302, having the original resolution, in the side-by-side type or the top-bottom type. The 3D video frame generator 303 may generate a 3D video frame by performing ½ sub-sampling on the left-video frame and the right-video received from the left-video input unit 301 and the right-video input unit 302, having the original resolution, in the vertical or horizontal direction, and combining the sub-sampled left-video and right-video frames in the side-by-side type or the top-bottom type.

Thus, the 3D video frame generator 303 generates a 3D video frame by combining the left-video frame and the right-video frame, and outputs the generated 3D video frame to the 3D video frame encoder 307. The 3D video frame generator 303 provides the composition information checker 305 with information regarding the type in which the 3D video is composed ("3D video composition type"), and resolution control information indicating the adjustment/non-adjustment of resolutions of the left-video frame and the right-video frame.

The composition information checker 305 checks the shooting information provided from the left-video input unit 301 and the right-video input unit 302, and the 3D video composition type and the resolution control information provided from the 3D video frame generator 303, and provides them to the 3D video data generator 309.

The 3D video frame encoder 307 is a device for encoding the 3D video frame output from the 3D video frame generator 303 and outputting an encoded 3D video stream, and a device for encoding 3D video frames based on the common video encoding scheme (e.g., MPEG-1, MPEG-2, MPEG-3, MPEG-4, H.264, and the like) may be adopted as the 3D video frame encoder 307.

The 3D video data generator 309 generates 3D video data by combining the composition information provided from the composition information checker 305 with the encoded 3D video stream provided from the 3D video frame encoder 307.

The 3D video data may be generated in a 3D video file format based on the details disclosed in File structure, as well as the Syntax and semantics of the Boxes in Chapters 7 and 8 of the standard document "ISO/IEC FDIS 23000-11:2009 Information technology—Multimedia application format (MPEG-A)-Part 11: Stereoscopic Video Application Format."

Specifically, the 3D video data generator 309 may generate 3D video data including an ftyp header (which is a header including information regarding file type and includes the file name, version information, version type and file compatibility information), a moov container, and an mdat container.

The ftyp header includes a file name, version information, a file type, and file compatibility information. The ftyp header is a header comprising information of the file type.

The moov container includes a field containing scene description information indicating temporal/spatial relationships among media objects included in a 3D video frame, i.e., an IOD (Initial Object Descriptor) track including all media objects included in the 3D video frame and profile information regarding a BIFS (Binary Format for Scenes) track and an OD (Object Descriptor) track, the BIFS track including information regarding composition relationships among media objects included in each scene, and the OD track including information regarding attributes of each media object.

Although the information regarding the composition relationships among the media objects is included in the BIFS track in an embodiment of the present invention, the information regarding the composition relationships among media objects may be included in any other tracks. For example, a LASeR (Light-weight Application Scene Representation) track is an alternative to the BIFS track.

The moov container according to an embodiment of the present invention may further include a stereoscopic video media information (svmi) box including information regarding the 3D video composition type. The svmi box may be defined as shown in FIG. 4A and the identifier included in stereoscopic_composition_type of the svmi box, as shown in FIG. 4A, may be defined as shown in FIG. 4B. The svmi box may further include resolution control information. For example, when the 3D video frame is generated by performing ½ sub-sampling on the left-video frame and the right-video frame received from the left-video input unit 301 and the right-video input unit 302, having the original resolution, in the horizontal direction, and combining the sub-sampled left-video and right-video frames in the side-by-side type, the 3D video data generator 309 may set the stereoscopic_composition_type to "0x00." However, when the 3D video frame is generated by combining the left-video frame and the right-video frame received from the left-video input unit 301 and the right-video input unit 302 and having the original resolution, in the side-by-side type, the 3D video data generator 309 may set the stereoscopic_composition_type to "0x05." Similarly, when the 3D video frame is generated by performing ½ sub-sampling on the left-video frame and the right-video frame received from the left-video input unit 301 and the right-video input unit 302 and having the original resolution, in the vertical direction, and combining the sub-sampled left-video and right-video frames in the top-bottom type, the 3D video data generator 309 may set the stereoscopic_composition_type to "0x04." On the other hand, when the 3D video frame is generated by combining the left-video frame and the right-video frame received from the left-video input unit 301 and the right-video input unit 302 and having the original resolution, in the top-bottom type, the 3D video data generator 309 may set the stereoscopic_composition_type to "0x06."

Figures 5B, 6A:
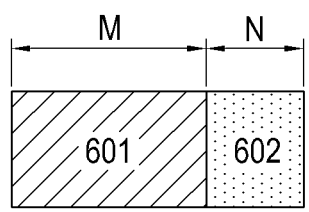
FIG. 5B is a diagram illustrating another example of an identifier included in a stereoscopic_composition_type field included in the svmi box shown in FIG. 5A.
FIG. 6A is a diagram illustrating an example of a structure of a 3D video frame.

In FIGS. 4A, 5A and 6A, the fields below "//stereo_mono_change information" may be defined as follows. "stereo_mono_change_count" is defined as a value determined by adding one (1) to the number of changes in type of the fragment from stereo to mono, or from mono to stereo. Because it starts from I=1, it is preferable for "stereo_mono_change_count" to be determined by adding one to the number of changes in type of the fragment so that information about the entire fragment period may be included. Moreover, "sample_count" represents the number of samples or frames having a continuous value, and "stereo_flag" indicates whether the current frame is a stereo frame or a mono frame. For example, stereo_flag=0 indicates that the current frame is a mono frame, while stereo_flag=1 indicates that the current frame is a stereo frame.

TABLE 1

| Type | S (stereo) | M (mono) | S (stereo) |
|---|---|---|---|
| Number of Frames | 300 | 500 | 100 |

Assume, as in Table 1, that there are stereo-type (S) content including 300 frames, mono-type (M) content including 500 frames and stereo-type (S) content including 100 frames. Using the syntaxes below "//stereo_mono_change information" in the syntaxes of FIGS. 4A, 5A and 6A, the content in Table 1 may be represented as in Table 2 below.

TABLE 2

| stereo_mono_change_count = 3 | |
|---|---|
| simpe_count | stereo_flg |
| 300 | 1 |
| 500 | 0 |
| 100 | 1 |

According to an embodiment of the present invention, if all frames are configured as stereo frames, "stereo_mono_change_count=1" is set. In addition, if all frames are configured as stereo frames, "sample_count=total number of frames" and "stereo_flag=1" may be set.

When the information regarding the 3D video composition type and the resolution control information are included in the svmi box as shown in FIGS. 4A and 4B, the information regarding the 3D video composition type and the resolution control information may be included in the 3D video data without additional change in the svmi box in a format defined in File structure, and Syntax and semantics of the Boxes, disclosed in Chapters 7 and 8 of the standard document "ISO/IEC FDIS 23000-11:2009 Information technology—Multimedia application format (MPEG-A)-Part 11: Stereoscopic Video Application Format."

FIG. 5A illustrates another example of a detailed structure of an svmi box according to an embodiment of the present invention, and FIG. 5B illustrates another example of a definition of an identifier included in stereoscopic_composition_type of the svmi box.

Referring to FIG. 5A, the 3D video data generator 309 includes the information regarding the 3D video composition type in stereoscopic_composition_type, and includes the resolution control information in is_half_resolution. Specifically, the identifier included in the stereoscopic_composition_type may be as shown in FIG. 5B. A value of is_half_resolution indicates the change or lack thereof in the original resolution of the left-video frame and the right-video frame. For example, if a value of is_half_resolution is 1, it indicates that the left-video frame and the right-video frame included in the 3D video frame having the original resolution have undergone ½ sub-sampling in the horizontal or vertical direction, whereas if a value of is_half_resolution is 0, it indicates that the left-video frame and the right-video frame having the original resolution are included in the 3D video frame without separate change. For example, when the 3D video frame is created by combining the left-video frame and the right-video frame having the original resolution in the top-bottom type without a separate change, the 3D video data generator 309 may set the stereoscopic_composition_type to "0x04" and set a value of is_half_resolution to "0."

When the information regarding the 3D video composition type and the resolution control information is included in the svmi box as shown in FIGS. 5A and 5B, the information regarding the 3D video composition type and the resolution control information may be included in the 3D video data by slightly changing the details of the svmi box without changing the details of stereoscopic_composition_type in the svmi box in a format defined in File structure, Syntax and semantics of the Boxes disclosed in Chapters 7 and 8 of the standard document "ISO/IEC FDIS 23000-11:2009 Information technology—Multimedia application format (MPEG-A)-Part 11: Stereoscopic Video Application Format."

FIG. 6A illustrates an example of a structure of a 3D video frame, and FIG. 6B illustrates another example of a detailed structure of an svmi box according to an embodiment of the present invention.

Referring to FIG. 6A, a 3D video frame may include a left-video frame 601 and a right-video frame 602 whose horizontal resolution sizes have different ratios. Put another way, a ratio of a horizontal resolution size of the left-video frame 601 to a horizontal resolution size of the right-video frame 602 may be set to M:N. Referring to FIG. 6B showing another example of the detailed structure of the svmi box, the 3D video data generator 309 may include the information regarding the 3D video composition type in stereoscopic_composition_type, and include information regarding the resolution size ratio in ratio_M_size and ratio_N_size. Specifically, if the left-video frame and the right-video frame included in the 3D video frame are combined in the side-by-side type at a horizontal resolution size ratio of M:N, the 3D video data generator 309 may include a horizontal resolution size of the left-video frame in ratio_M_size, and include a horizontal resolution size of the right-video frame in ratio_N_size. Similarly, if the left-video frame and the right-video frame included in the 3D video frame are combined in the top-bottom type at a vertical resolution size ratio of M:N, the 3D video data generator 309 may include the vertical resolution size of the left-video frame in ratio_M_size, and include the vertical resolution size of the right-video frame in ratio_N_size.

Depending on the order of the left-video frame and the right-video frame included in the 3D video frame, a value of is_left_first may be set, the horizontal resolution size of the left-video frame may be included in ratio_M_size, and the horizontal resolution size of the right-video frame may be included in ratio_N_size.

Figure 7:
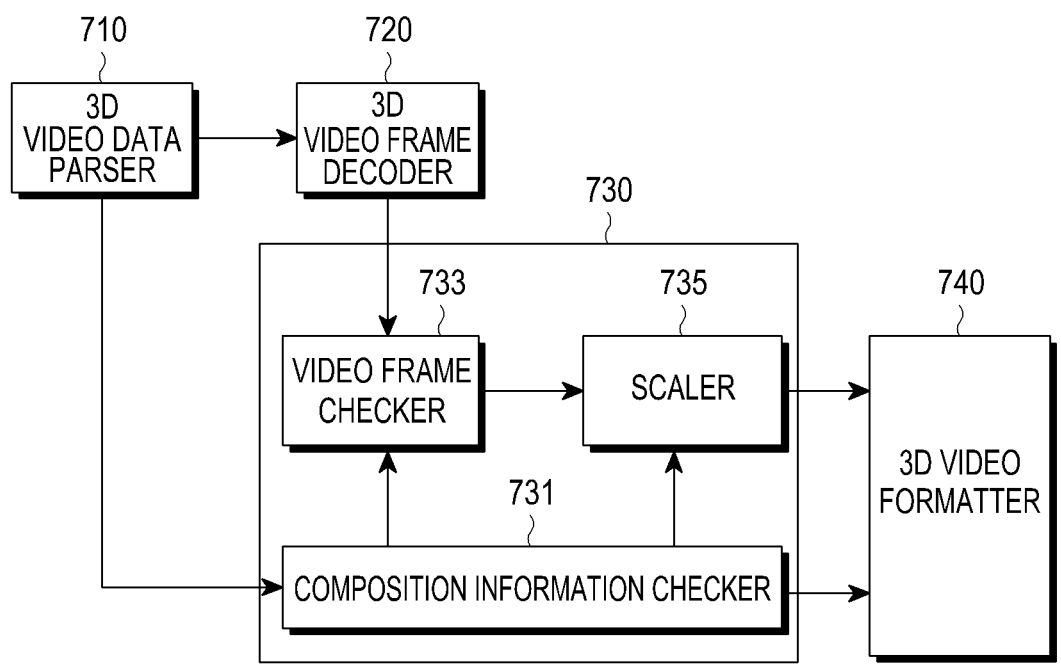
FIG. 7 is a block diagram illustrating a structure of a 3D video output apparatus according to an embodiment of the present invention.

FIG. 7 is a block diagram illustrating a structure of a 3D video output apparatus according to an embodiment of the present invention.

Referring to FIG. 7, the 3D video output apparatus includes a 3D video data parser 710, a 3D video frame decoder 720, a 3D video scaler 730, and a 3D video formatter 740.

The 3D video data parser 710 receives 3D video data output from the 3D video generation apparatus according to an embodiment of the present invention, and detects and separates an encoded 3D video stream and its composition information from the received 3D video data. The 3D video data parser 710 delivers the encoded 3D video stream to the 3D video frame decoder 720, and delivers the composition information to the 3D video scaler 730. For example, the 3D video data parser 710 detects an ftyp header included in the 3D video data and the composition information included in a moov container, and provides them to the 3D video scaler 730. The 3D video data parser 710 detects the encoded 3D video stream included in an mdat container, and provides it to the 3D video frame decoder 720.

The 3D video frame decoder 720 is a device for decoding a 3D video frame encoded by an encoding scheme of an encoder in the 3D video generation apparatus, and a device for decoding an encoded 3D video stream based on the common video decoding scheme (e.g., MPEG-1, MPEG-2, MPEG-3, MPEG-4, H.264, and the like) may be adopted as the 3D video frame decoder 720.

Based on the composition information, the 3D video scaler 730 checks information regarding the 3D video composition type indicating a composition type of a plurality of video frames (e.g., a left-video frame and a right-video frame) included in the 3D video frame, and separates the plurality of video frames included in the 3D video frame. The 3D video scaler 730 checks the resolution control information indicating the adjustment/non-adjustment of resolutions of the video frames, and converts the resolutions of the video frames to match with the resolution of the display device.

Specifically, the 3D video scaler 730 includes a composition information checker 731, a video frame checker 733, and a scaler 735.

The composition information checker 731 detects the information (e.g., the information regarding the 3D video composition type and the resolution control information) used to restore a 3D video frame, from the ftyp header and the composition information included in the moov container. The information regarding the 3D video composition type may be provided to the video frame checker 733, and the resolution control information may be provided to the scaler 735. The composition information checker 731 detects the information (e.g., synchronization information and sampling information of the 3D video frame) used to decode the encoded 3D video stream, and provides the detected information to the 3D video frame decoder 720. The information used to decode the encoded 3D video stream may be directly provided to the 3D video frame decoder 720 from the 3D video data parser 710.

The video frame checker 733 separates the 3D video frame provided from the 3D video frame decoder 720 into a left-video frame and a right-video frame based on the information regarding the 3D video composition type.

The scaler 735 scales both the left-video frame and the right-video frame separated by the video frame checker 733, based on the resolution control information. More specifically, if the resolution control information indicates that the original left-video and right-video frames have undergone ½ sub-sampling in the horizontal (or vertical) direction, the scaler 735 performs ×2 up-sampling on each of the separated left-video and right-video frames in the horizontal (or vertical) direction to restore the left-video frame and the right-video frame to a left-video frame and a right-video frame having their original resolution sizes. The scaler 735 scales each of the restored left-video and right-video frames to match with the resolution of the display device.

The composition information checker 731 may detect the information regarding the 3D video composition type and the resolution control information, using the information included in the svmi box included in the moov container. When the svmi box is defined as shown in FIG. 4A and the identifier included in the stereoscopic_composition_type of the svmi box is defined as shown in FIG. 4B, the composition information checker 731 may detect the information regarding the 3D video composition type and the resolution control information, using the information included in the stereoscopic_composition_type field of the svmi box.

If the stereoscopic_composition_type field is set to "0x00," the composition information checker 731 determines that the left-video frame and the right-video frame having the original resolution have undergone ½ sub-sampling in the horizontal direction and the sub-sampled left-video and right-video frames are combined in the side-by-side type.

If the identifier included in the stereoscopic_composition_type field is set to "0x01," the composition information checker 731 determines that the left-video frame and the right-video frame are split in the vertical direction, and segments of the split left-video and right-video frames are alternately arranged and combined in the vertical line interleaved type. If the identifier included in the stereoscopic_composition_type field is set to "0x02," the composition information checker 731 determines that each of the left-video frame and the right-video frames is sequentially arranged and combined in the frame sequential type. If the identifier included in the stereoscopic_composition_type field is set to "0x03," the composition information checker 731 determines that the left-video frame and the right-video frame are alternately and sequentially arranged and combined in the left/right view sequential type.

If the identifier included in the stereoscopic_composition_type field is set to "0x04," the composition information checker 731 determines that the left-video frame and the right-video frame having the original resolution have undergone ½ sub-sampling in the vertical direction, and the sub-sampled left-video and right-video frames are combined in the top-bottom type. If the identifier included in the stereoscopic_composition_type field is set to "0x05," the composition information checker 731 determines that the left-video frame and the right-video frame having the original resolution are combined in the side-by-side type. If the identifier included in the stereoscopic_composition_type field is set to "0x06," the composition information checker 731 determines that the left-video frame and the right-video frame having the original resolution are combined in the top-bottom type.

When the svmi box is defined as shown in FIG. 5A and the an identifier included in the stereoscopic_composition_type field of the svmi box is defined as shown in FIG. 5B, the composition information checker 731 may determine the information regarding the 3D video composition type by checking the identifier included in the stereoscopic_composition_type field of the svmi box, and determine the resolution control information by checking the identifier included in the is_half_resolution field. For example, if a value of the is_half_resolution is set to '1', the composition information checker 731 determines that the left-video frame and the right-video frame included in the 3D video frame and having the original resolution have undergone 1/s sub-sampling in the horizontal or vertical direction. If a value of is_half_resolution is set to "0," the composition information checker 731 determines that the left-video frame and the right-video frame having the original resolution are included in the 3D video frame without separate change.

If the identifier included in the stereoscopic_composition_type field is set to "0x00," the composition information checker 731 determines that the left-video frame and the right-video frame are combined in the side-by-side type. If the identifier included in the stereoscopic_composition_type field is set to "0x01," the composition information checker 731 determines that the left-video frame and the right-video frame are split in the vertical direction, and segments of the split left-video and right-video frames are alternately arranged and combined in the vertical line interleaved type. If the identifier included in the stereoscopic_composition_type field is set to "0x02," the composition information checker 731 determines that each of the left-video frame and the right-video frame frames is sequentially arranged and combined in the frame sequential type. If the identifier included in the stereoscopic_composition_type field is set to "0x03," the composition information checker 731 determines that the left-video frame and the right-video frame are alternately and sequentially arranged and combined in the left/right view sequential type. If the identifier included in the stereoscopic_composition_type field is set to "0x04," the composition information checker 731 determines that the left-video frame and the right-video frame are vertically arranged and combined in the top-bottom type.

When the svmi box is defined as shown in FIG. 6B, the composition information checker 731 may determine the information regarding the 3D video composition type by checking the identifier included in the stereoscopic_composition_type field, and determine the resolution size ratio using the information included in the ratio_M_size field and the ratio_N_size field.

The composition information checker 731 may determine the information regarding the 3D video composition type in the same way as when the svmi box is defined as shown in FIG. 5A.

In order to determine the resolution size ratio, the composition information checker 731 may determine the order of arrangement of the left-video frame and the right-video frame by checking a value of the is_left_first field, and may determine the horizontal (or vertical) resolution sizes of the left-video frame and the right-video frame by checking values included in the ratio_M_size field and the ratio_N_size field.

The 3D video formatter 740 combines the left-video frame and the right-video frame provided from the 3D video scaler 730 according to the 3D video output scheme of the display device.

Figure 8:
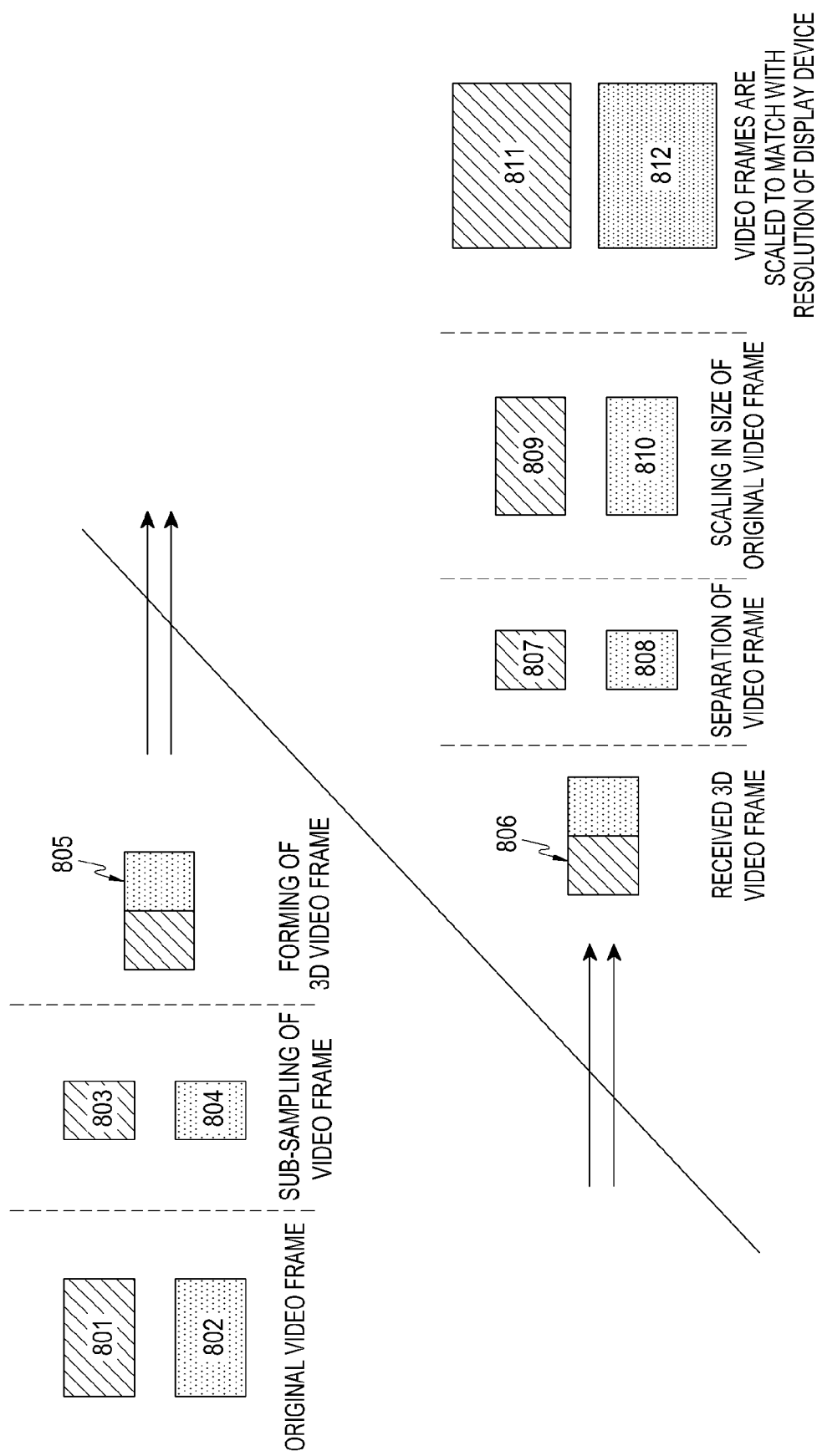
FIG. 8 is a diagram illustrating a first example of video frames created by a 3D video generation apparatus and a 3D video output apparatus according to an embodiment of the present invention.

FIG. 8 illustrates an example of video frames created by a 3D video generation apparatus and a 3D video output apparatus according to an embodiment of the present invention.

Operations of the 3D video generation apparatus and the 3D video output apparatus according to an embodiment of the present invention will be described with reference to FIG. 8.

First, the left-video input unit 301 of FIG. 3 in the 3D video generation apparatus generates an original left-video frame 801 and the right-video input unit 302 generates an original right-video frame 802.

The 3D video frame generator 303 then generates sampled left-video and right-video frames 803 and 804 by performing ½ sub-sampling on the left-video frame 801 and the right-video frame 802, respectively. The 3D video frame generator 303 generates a 3D video frame 805 composed in the side-by-side type by horizontally arranging the sample left-video and right-video frames 803 and 804.

The 3D video frame generator 303 provides the composition information checker 305 with the resolution control information indicating that the left-video frame 801 and the right-video frame 802 have undergone ½ sub-sampling, and the information regarding the 3D video composition type, which indicates the side-by-side type.

The 3D video frame encoder 307 encodes the 3D video frame 805, and provides the encoded 3D video stream to the 3D video data generator 309. The composition information checker 305 provides the resolution control information and information regarding the 3D video composition type to the 3D video data generator 309.

The 3D video data generator 309 generates 3D video data that includes an ftyp header including a file name, version information, a file type and file compatibility information, a moov container including the resolution control information and the information regarding the 3D video composition type, and a mdat container including the encoded 3D video stream. The resolution control information and the information regarding the 3D video composition type may be included in the svmi box defined as shown in FIG. 4A. For example, a value included in a stereoscopic_composition_type field of the svmi box may be "0x00."

The 3D video data generated by the 3D video generation apparatus is provided to the 3D video output apparatus.

The 3D video data parser 710 in the 3D video output apparatus detects the ftyp header included in the 3D video data and the composition information included in the moov container, and provides them to the 3D video scaler 730. The 3D video data parser 710 detects the encoded 3D video stream included in the mdat container and provides it to the 3D video frame decoder 720. The 3D video frame decoder 720 decodes the encoded 3D video stream using a scheme corresponding to the encoding scheme of the 3D video frame encoder 307 in the 3D video generation apparatus, thereby restoring a 3D video frame 806.

The restored 3D video frame 806 is provided to the 3D video scaler 730. The composition information checker 731 in the 3D video scaler 730 detects the information (e.g., the information regarding the 3D video composition type and the resolution control information) used to restore the 3D video frame, from the ftyp header and the composition information included in the moov container. The composition information checker 731 detects the information regarding the 3D video composition type and the resolution control information, using the information included in the svmi box included in the moov container. As a value included in the stereoscopic_composition_type field of the svmi box, which is included in the moov container of the 3D video data, is set to "0x00," the composition information checker 731 determines that the left-video frame and the right-video frame included in the 3D video frame are combined in the side-by-side type, and provides the information to the video frame checker 733. Additionally, the composition information checker 731 determines that the left-video frame and the right-video frame included in the 3D video frame have undergone ½ sub-sampling, and provides the information to the scaler 735.

The video frame checker 733 separates the 3D video frame 806 into a left-video frame 807 and a right-video frame 808, which are combined in the side-by-side type, and outputs the separated left-video and right-video frames 807 and 808 to the scaler 735. The scaler 735 creates a left-video frame 809 and a right-video frame 810 having their original resolution sizes by performing ×2 up-sampling on the separated left-video and right-video frames 807 and 808. The scaler 735 then creates a left-video frame 811 and a right-video frame 812 having the resolution size of the display device by scaling each of the left-video frame 809 and the right-video frame 810 to match with the resolution of the display device.

The 3D video formatter 740 combines the left-video frame 811 and the right-video frame 812 provided from the 3D video scaler 730 according to the 3D video output scheme of the display device.

Thus, the 3D video output apparatus converts the left-video frame and the right-video frame included in the 3D video frame into the left-video frame and the right-video frame having their original resolution sizes, and scales each of the converted left-video and right-video frames having their original resolution sizes to match with the resolution of the display device, thereby minimizing distortion of the 3D video frame.

Figure 9:
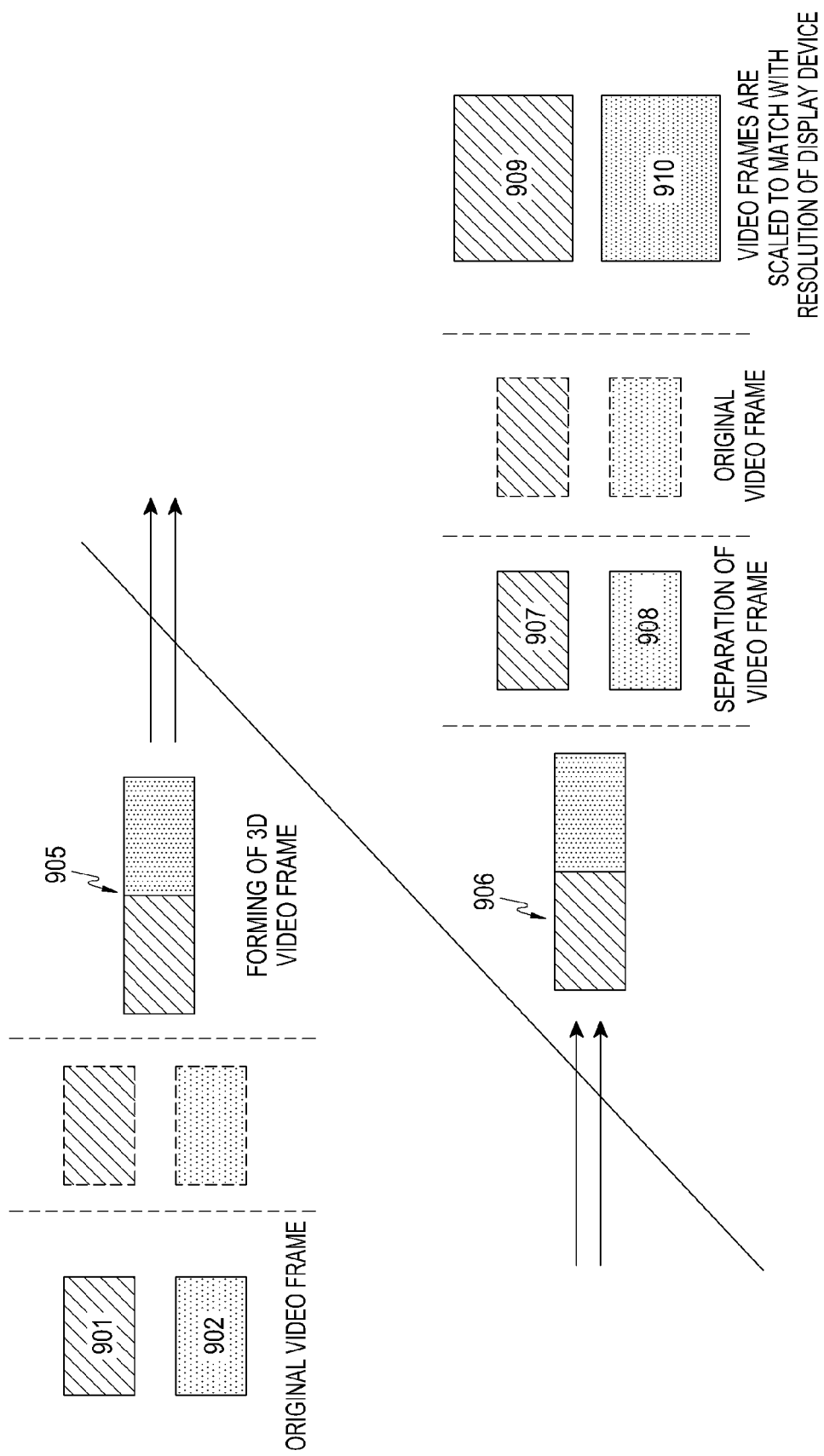
FIG. 9 is a diagram illustrating a second example of video frames created by a 3D video generation apparatus and a 3D video output apparatus according to an embodiment of the present invention.

FIG. 9 illustrates a second example of video frames created by a 3D video generation apparatus and a 3D video output apparatus according to an embodiment of the present invention.

Operations of the 3D video generation apparatus and the 3D video output apparatus according to an embodiment of the present invention will be described with reference to FIG. 9.

Similarly to FIG. 8, first, the left-video input unit 301 of FIG. 3 in the 3D video generation apparatus generates an original left-video frame 901 and the right-video input unit 302 generates an original right-video frame 902.

The 3D video frame generator 303 generates a 3D video frame 905 composed in the side-by-side type by horizontally arranging the original left-video frame 901 and the original right-video frame 902.

The 3D video frame generator 303 provides the composition information checker 305 with the resolution control information indicating that the left-video frame 901 and the right-video frame 902 are their original video frames, and the information regarding the 3D video composition type, which indicates the side-by-side type.

The 3D video frame encoder 307 encodes the 3D video frame 905 and provides the encoded 3D video stream to the 3D video data generator 309. The composition information checker 305 provides the resolution control information and the information regarding the 3D video composition type to the 3D video data generator 309.

The 3D video data generator 309 generates 3D video data that includes an ftyp header including a file name, version information, a file type and file compatibility information, a moov container including the resolution control information and the information regarding the 3D video composition type, and a mdat container including the encoded 3D video stream. The resolution control information and the information regarding the 3D video composition type may be included in the svmi box defined as shown in FIG. 4A. For example, a value included in a stereoscopic_composition_type field of the svmi box may be "0x05."

The 3D video data generated by the 3D video generation apparatus is provided to the 3D video output apparatus.

The 3D video data parser 710 in the 3D video output apparatus detects the ftyp header included in the 3D video data and the composition information included in the moov container, and provides them to the 3D video scaler 730. The 3D video data parser 710 detects the encoded 3D video stream included in the mdat container and provides it to the 3D video frame decoder 720. The 3D video frame decoder 720 restores a 3D video frame 906 by decoding the encoded 3D video stream using a scheme corresponding to the encoding scheme of the 3D video frame encoder 307 in the 3D video generation apparatus.

The restored 3D video frame 906 is provided to the 3D video scaler 730. The composition information checker 731 in the 3D video scaler 730 detects the information (e.g., information regarding the 3D video composition type and the resolution control information) used to restore the 3D video frame, from the ftyp header and the composition information included in the moov container. The composition information checker 731 detects the information regarding the 3D video composition type and the resolution control information, using the information included in the svmi box included in the moov container. As a value included in the stereoscopic_composition_type field of the svmi box, which is included in the moov container of the 3D video data, is set to "0x05," the composition information checker 731 determines that the left-video frame and the right-video frame included in the 3D video frame are combined in the side-by-side type, and provides the information to the video frame checker 733. Additionally, the composition information checker 731 determines that the left-video frame and the right-video frame included in the 3D video frame are their original video frames, and provides the information to the scaler 735.

The video frame checker 733 separates the 3D video frame 906 into a left-video frame 907 and a right-video frame 908, which are combined in the side-by-side type, and outputs the separated left-video and right-video frames 907 and 908 to the scaler 735. The scaler 735 creates a left-video frame 909 and a right-video frame 910 having the resolution size of the display device by performing ×2 up-sampling on the separated left-video and right-video frames 807 and 808. Thereafter, the scaler 735 creates a left-video frame 811 and a right-video frame 812 having the resolution size of the display device by scaling each of the left-video frame 907 and the right-video frame 908 having their original resolution sizes to match with the resolution of the display device.

The 3D video formatter 740 combines the left-video frame 909 and the right-video frame 910 provided from the 3D video scaler 730 according to the 3D video output scheme of the display device.

Thus, the 3D video output apparatus may output the 3D video using its original intact left-video frame and right-video frame, thereby minimizing distortion of the 3D video frame without degradation of the horizontal/vertical resolutions of the left-video frame and the right-video frame included in the 3D video frame.

Figure 10:
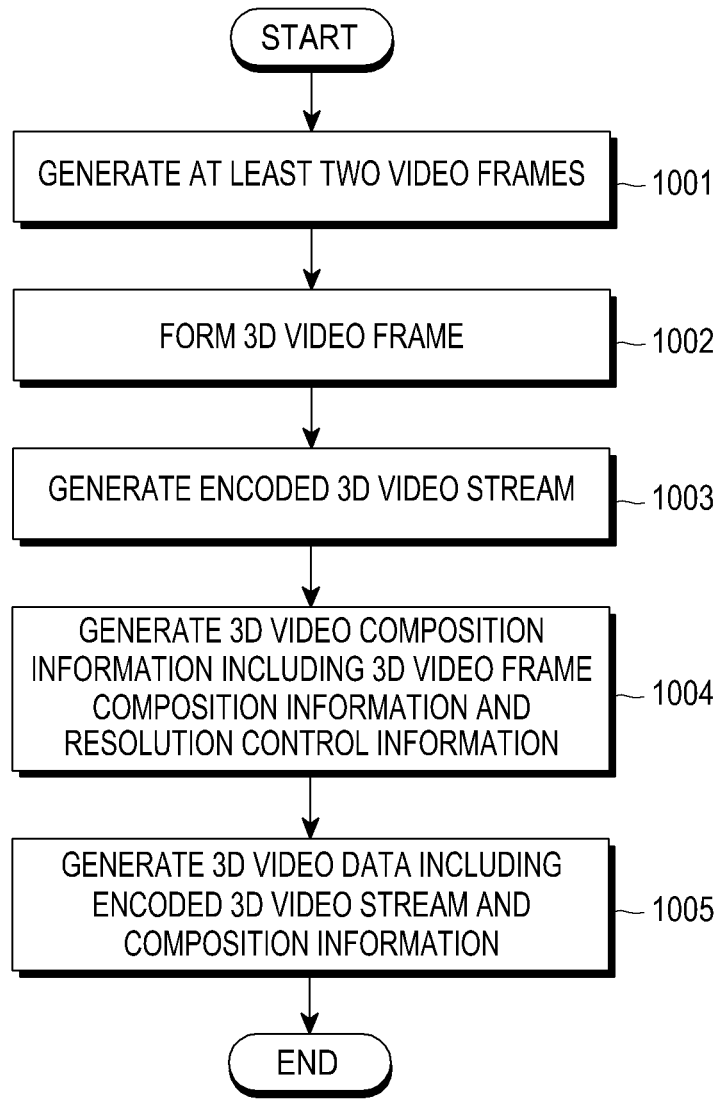
FIG. 10 is a flowchart illustrating a process of a 3D video generation method according to an embodiment of the present invention.

FIG. 10 illustrates a process of a 3D video generation method according to an embodiment of the present invention.

In step 1001, referring to FIG. 10, the 3D video generation method according to an embodiment of the present invention includes a process of generating a plurality of video frames. For example, the left-video input unit 301 of see FIG. 3 in the 3D video generation apparatus generates an original left-video frame and the right-video input unit 302 generates an original right-video frame.

In step 1002, the 3D video frame generator 303 generates a 3D video fame by arranging the original left-video frame and the original right-video frame according to the composition type of the 3D video frame.

In step 1003, the 3D video frame is provided to the 3D video frame encoder 307, and the 3D video frame encoder 307 generates an encoded 3D video stream by encoding the 3D video frame 905 and provides the generated encoded 3D video stream to the 3D video data generator 309.

In step 1004, the 3D video frame generator 303 checks the information regarding the 3D video composition type, which indicates how the left-video frame and the right-video frame are combined in the 3D video frame forming process of step 1002, and the resolution control information indicating the change/non-change in the horizontal (or vertical) resolution size of the left-video frame and the right-video frame, and generates composition information including the information regarding the 3D video composition type and the resolution control information (see).

The 3D video data generator 309 generates 3D video data that includes an ftyp header including a file name, version information, a file type and file compatibility information, a moov container including the resolution control information and the information regarding the 3D video composition type, and a mdat container including the encoded 3D video stream (see step 1005). The resolution control information and the information regarding the 3D video composition type may be included in the svmi box defined as shown in FIG. 4A. An identifier included in stereoscopic_composition_type of the svmi box may be defined as shown in FIG. 4B. The svmi box may further include the resolution control information. For example, when the 3D video frame is generated by performing ½ sub-sampling on the left-video frame and the right-video frame having the original resolution, in the horizontal direction, and combining the sub-sampled left-video and right-video frames in the side-by-side type, the 3D video data generator 309 may set the stereoscopic_composition_type field to "0x00." On the other hand, when the 3D video frame is generated by combining the left-video frame and the right-video frame having the original resolution in the side-by-side type, the 3D video data generator 309 may set the stereoscopic_composition_type field to "0x05." Similarly, when the 3D video frame is generated by performing ½ sub-sampling on the left-video frame and the right-video frame received from the left-video input unit 301 and the right-video input unit 302 and having the original resolution, in the vertical direction, and combining the sub-sampled left-video and right-video frames in the top-bottom type, the 3D video data generator 309 may set the stereoscopic_composition_type field to "0x04." On the other hand, when the 3D video frame is generated by combining the left-video frame and the right-video frame received from the left-video input unit 301 and the right-video input unit 302 and having the original resolution, in the top-bottom type, the 3D video data generator 309 may set the stereoscopic_composition_type field to "0x06."

When the information regarding the 3D video composition type and the resolution control information are included in the svmi box as shown in FIGS. 4A and 4B, the information regarding the 3D video composition type and the resolution control information may be included in the 3D video data without additional change in the svmi box in a format defined in File structure, and Syntax and semantics of the Boxes, disclosed in Chapters 7 and 8 of the standard document "ISO/IEC FDIS 23000-11:2009 Information technology—Multimedia application format (MPEG-A)—Part 11: Stereoscopic Video Application Format."

Alternatively, the svmi box may be made as shown in FIG. 5A and an identifier included in stereoscopic_composition_type of the svmi box may be defined as shown in FIG. 5B. The 3D video data generator 309 may insert the information regarding the 3D video composition type into the stereoscopic_composition_type field and the resolution control information into the is_half_resolution field. Specifically, the identifier included in the stereoscopic_composition_type field may be defined as shown in FIG. 5B. A value of the is_half_resolution field indicates the change/non-change in the original resolution of the left-video frame and the right-video frame having the original resolution. For example, if a value of is_half_resolution is 1, it indicates that the left-video frame and the right-video frame included in the 3D video frame and having the original resolution have undergone ½ sub-sampling in the horizontal or vertical direction, whereas if a value of is_half_resolution is 0, it indicates that the left-video frame and the right-video frame having the original resolution are included in the 3D video frame without separate change. For example, when the 3D video frame is created by combining the left-video frame and the right-video frame having the original resolution in the side-by-side type without separate change, the 3D video data generator 309 may set the stereoscopic_composition_type field to "0x00" and set a value of is_half_resolution to "0."

When the information regarding the 3D video composition type and the resolution control information are included in the svmi box as shown in FIGS. 5A and 5B, the information regarding the 3D video composition type and the resolution control information may be included in the 3D video data by slightly changing the details of the svmi box without changing the details of stereoscopic_composition_type in the svmi box in a format defined in File structure, and Syntax and semantics of the Boxes disclosed in Chapters 7 and 8 of the standard document "ISO/IEC FDIS 23000-11:2009 Information technology—Multimedia application format (MPEG-A)-Part 11: Stereoscopic Video Application Format."

Alternatively, the svmi box may be created as shown in FIG. 6B. Referring to FIG. 6B, in another example of a detailed structure of the svmi box, the 3D video data generator 309 may insert the information regarding the 3D video composition type into the stereoscopic_composition_type field, and the information regarding the resolution size ratio into the ratio_M_size field and the ratio_N_size field. Specifically, if the left-video frame and the right-video frame included in the 3D video frame are combined in the side-by-side type at a horizontal resolution size ratio of M:N, the 3D video data generator 309 may insert the horizontal resolution size of the left-video frame in the ratio_M_size field, and the horizontal resolution size of the right-video frame in the ratio_N_size field. Similarly, if the left-video frame and the right-video frame included in the 3D video frame are combined in the top-bottom type at a vertical resolution size ratio of M:N, the 3D video data generator 309 may insert the vertical resolution size of the left-video frame in ratio_M_size, and the vertical resolution size of the right-video frame in ratio_N_size.

Figure 11:
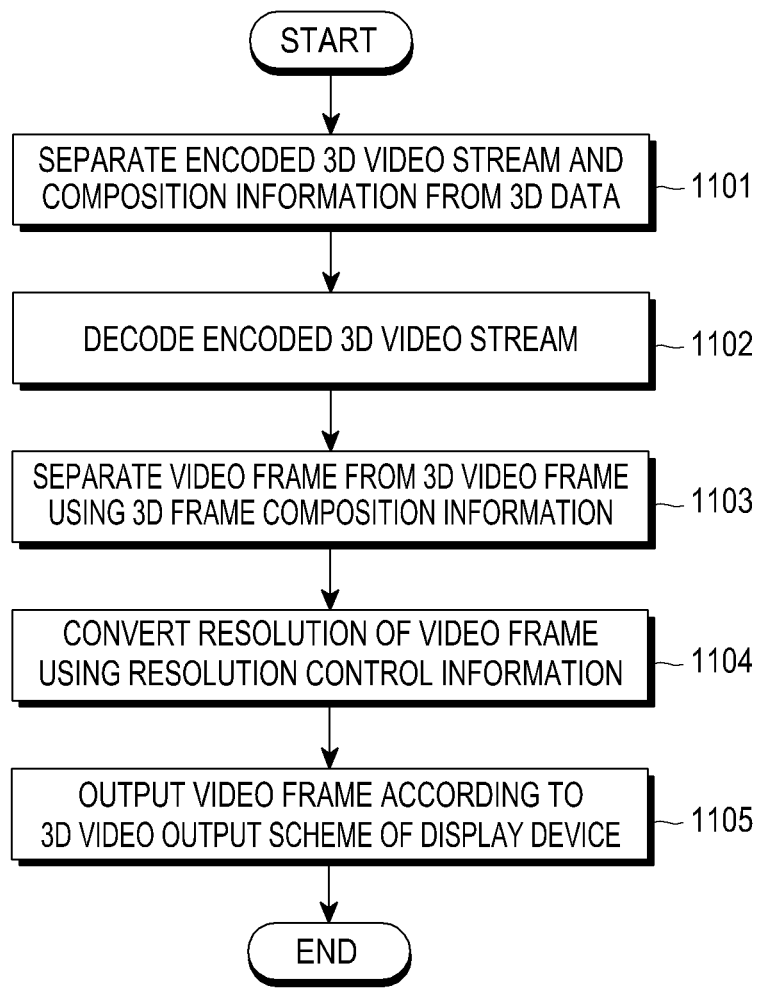
FIG. 11 is a flowchart illustrating a process of a 3D video output method according to an embodiment of the present invention.

FIG. 11 illustrates a process of a 3D video output method according to an embodiment of the present invention.

In step 1101, the 3D video data parser 710 in the 3D video output apparatus detects an ftyp header included in the 3D video data and composition information included in the moov container, provides the detected data to the 3D video scaler 730, detects the encoded 3D video stream included in the mdat container, and provides the detected encoded 3D video stream to the 3D video frame decoder 720.

In step 1102, the 3D video frame decoder 720 restores the 3D video frame by decoding the encoded 3D video stream using a scheme corresponding to the encoding scheme of the 3D video frame encoder 307 in the 3D video generation apparatus. The restored 3D video frame is provided to the 3D video scaler 730.

In step 1103, the composition information checker 731 in the 3D video scaler 730 checks the information (e.g., the information regarding the 3D video composition type) used to restore the 3D video frame, from the composition information included in the svmi box included in the moov container. The composition information checker 731 separates the left-video frame and the right-video frame included in the 3D video frame using the information regarding the 3D video composition type.

In step 1104, the composition information checker 731 detects the resolution control information from the composition information included in the svmi box included in the moov container, and creates a left-video frame and a right-video frame having the resolution size of the display device by scaling each of the left-video frame and the right-video frame to match with the resolution of the display device, using the resolution control information. Specifically, if the resolution control information indicates that the left-video frame and the right-video frame included in the 3D video frame have undergone ½ sub-sampling in the horizontal or vertical direction, the scaler 735 creates a left-video frame and a right-video frame having their original resolution sizes by performing ×2 up-sampling on the left-video frame and the right-video frames included in the 3D video frame in the horizontal or vertical direction, and scales each of the left-video frame and the right-video frame having their original resolution sizes to match with the resolution of the display device.

However, if the resolution control information indicates that the left-video frame and the right-video frame included in the 3D video frame are the left-video frame and the right-video frame having their original resolution sizes, the scaler 735 scales each of the left-video frame and the right-video frame to match with the resolution of the display device without the process of up-sampling the left-video frame and the right-video frame included in the 3D video frame.

In step 1105, the 3D video formatter 740 combines the left-video frame 909 and the right-video frame 910 provided from the 3D video scaler 730 according to the 3D video output scheme of the display device.

As is apparent from the foregoing description, the left-video frame and the right-video frame included in the 3D video frame are converted into a left-video frame and a right-video frame having their original resolution sizes based on the resolution control information, and then each of the converted left-video frame and right-video frame having their original resolution sizes is scaled to match with the resolution of the display device, making it possible to minimize the distortion of the 3D video frame.

The 3D video frame is output by using the intact original left-video and right-video frames included in the 3D video frame without performing ½ sub-sampling thereon in the horizontal or vertical direction, making it possible to output the 3D video frame without degradation of the horizontal or vertical resolution of the left-video frame and the right-video frame included in the 3D video frame.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for generating 3-Dimensional (3D) video data, the apparatus comprising:
   one or more video input units configured to generate video frames based on one or more images received through one or more image sensors, and generate shooting information including shooting characteristics of the video frames, wherein the shooting characteristics include a distance from a subject, a shooting angle or one or more movements of the one or more video input units;
   a 3D video frame generator configured to:
     generate a 3D video frame by combining a plurality of video frames, and
     generate 3D video frame composition information indicating a composition type of the plurality of video frames included in the 3D video frame, and resolution control information indicating adjustment/non-adjustment of resolutions of the video frames;
   a 3D video frame encoder configured to:
     encode the 3D video frame, and
     output the 3D video stream;
   a composition information checker configured to check 3D video composition information including the shooting information, the 3D video frame composition information, and the resolution control information; and
   a 3D video data generator configured to:
     generate 3D video data by combining the 3D video composition information and the encoded 3D video stream, and
     generate an identifier indicating:
       a first top-bottom type or a second top-bottom type, and
       a first side-by-side type or a second side-by-side type,
     wherein the first top-bottom type indicates that the 3D video frame is composed in a top-bottom type by adjusting a resolution of the 3D video frame,
     wherein the second top-bottom type indicates that the 3D video frame is composed in the top-bottom type without adjusting a resolution of the 3D video frame,
     wherein the first side-by-side type indicates that the 3D video frame is composed in a side-by-side type by adjusting a resolution of the 3D video frame, and
     wherein the second side-by-side type indicates that the 3D video frame is composed in the side-by-side type without adjusting a resolution of the 3D video frame.

2. The apparatus of claim 1, wherein the resolution control information includes information indicating whether the video frames have undergone sub-sampling.

3. The apparatus of claim 1, wherein the identifier further indicates at least one of:
   a vertical line interleaved type;
   a frame sequential type; and
   a left/right view sequential type.

4. The apparatus of claim 1, wherein the 3D video data generator is further configured to generate
   a second identifier indicating at least one of adjustment of a resolution of the 3D video frame and non-adjustment of a resolution of the 3D video frame.

5. The apparatus of claim 1, wherein the 3D video data generator is further configured to generate
   a ratio of at least one video frame included in the 3D video frame.

6. A method for generating 3-Dimensional (3D) video data, the method comprising:
generating video frames based on one or more images received through one or more image sensors;
generating a 3D video frame by combining a plurality of video frames;
outputting an encoded 3D video stream by encoding the 3D video frame;
generating 3D video composition information that includes shooting information including shooting characteristics of the video information, the 3D video frame composition information indicating a composition type of the plurality of video frames included in the 3D video frame, and resolution control information indicating adjustment/non-adjustment of resolutions of the video frames, wherein the shooting characteristics include a distance from a subject, a shooting angle, and one or more movements of the one or more video input units; and
generating 3D video data by combining the encoded 3D video stream and the 3D video composition information.

7. The method of claim 6, wherein the resolution control information includes information indicating whether the video frames have undergone sub-sampling.

8. The method of claim 6, wherein generating the 3D video composition information comprises generating, in a stereoscopic video media information (svmi) box, an identifier indicating at least one of:
a first side-by-side type indicating that the 3D video frame is composed in a side-by-side type by adjusting a resolution of the 3D video frame;
a vertical line interleaved type;
a frame sequential type;
a left/right view sequential type;
a first top-bottom type indicating that the 3D video frame is composed in a top-bottom type by adjusting a resolution of the 3D video frame;
a second side-by-side type indicating that the 3D video frame is composed in the side-by-side type without adjusting a resolution of the 3D video frame; and
a second top-bottom type indicating that the 3D video frame is composed in the top-bottom type without adjusting a resolution of the 3D video frame.

9. The method of claim 6, wherein generating the 3D video composition information comprises generating, in an svmi box,
an identifier indicating at least one of:
a side-by-side type indicating that the 3D video frame is composed in the side-by-side type;
a vertical line interleaved type;
a frame sequential type;
a left/right view sequential type; and
a top-bottom type indicating that the 3D video frame is composed in the top-bottom type; and
a second identifier indicating at least one of adjustment of a resolution of the 3D video frame and non-adjustment of a resolution of the 3D video frame.

10. The method of claim 6, wherein generating the 3D video composition information comprises generating, in an svmi box,
an identifier indicating at least one of:
a side-by-side type indicating that the 3D video frame is composed in the side-by-side type;
a vertical line interleaved type;
a frame sequential type;
a left/right view sequential type; and
a top-bottom type indicating that the 3D video frame is composed in the top-bottom type; and
a ratio of at least one video frame included in the 3D video frame.

* * * * *